US006626675B1

(12) United States Patent
Webber

(10) Patent No.: US 6,626,675 B1
(45) Date of Patent: Sep. 30, 2003

(54) MULTIPLE ACTIVITY CENTER

(75) Inventor: Sharon G. Webber, Greer, SC (US)

(73) Assignee: Super Duper, Inc., Greenville, SC (US)

( * ) Notice: Subject to any disclaimer, the term of this patent is extended or adjusted under 35 U.S.C. 154(b) by 0 days.

(21) Appl. No.: 09/874,441

(22) Filed: Jun. 5, 2001

(51) Int. Cl.$^7$ .............................................. G09B 19/00
(52) U.S. Cl. ...................... 434/156; 454/408; 454/172; 454/179; 454/185
(58) Field of Search .................................... 434/365, 408, 434/413, 416, 425, 428, 430, 429, 238, 258, 259, 260, 156, 167, 172, 179; 40/124.12, 124.14, 124.16, 124.19

(56) References Cited

U.S. PATENT DOCUMENTS

| | | | |
|---|---|---|---|
| 4,115,930 A | | 9/1978 | Beck ........................... 35/7 R |
| 4,426,801 A | * | 1/1984 | Gates .......................... 40/606 |
| 4,545,768 A | * | 10/1985 | Hinnen ........................ 434/304 |
| 5,070,665 A | * | 12/1991 | Marrin ......................... 52/239 |
| 5,366,378 A | | 11/1994 | Johannsen et al. ........... 434/187 |
| 5,501,603 A | | 3/1996 | Mueller et al. .............. 434/419 |
| 5,649,379 A | * | 7/1997 | Hoffman ...................... 40/617 |
| 5,720,464 A | * | 2/1998 | Meinscher ................ 2448/447 |
| 5,788,503 A | * | 8/1998 | Shapiro ....................... 434/172 |
| 5,865,627 A | | 2/1999 | Foresman ................... 434/193 |
| 5,987,825 A | * | 11/1999 | Rosen .......................... 52/36.1 |
| 6,142,786 A | * | 11/2000 | Culberson ................... 434/258 |
| 6,203,878 B1 | * | 3/2001 | Davis .......................... 428/83 |

OTHER PUBLICATIONS

"Frame 2 Frame Children's Construction Sets" website, 1999.*

* cited by examiner

Primary Examiner—Derris H. Banks
Assistant Examiner—Kurt Fernstrom
(74) Attorney, Agent, or Firm—McNair Law Firm, P.A.; Cort Flint

(57) ABSTRACT

A multiple activity apparatus is disclosed for educational, therapeutic, or recreational use comprising three rectangular frame members joined at abutting ends in a triangular configuration having open triangular ends. The triangular configuration has a base and upwardly converging sides with a utility board mounted in each respective frame member. Each board has an exterior work surface so that a pair of upright work surfaces are selectively positionable for use at any one time. A method of utilizing visual teaching aids comprises the steps of assembling three utility panels each having a side surface useful as a teaching aid; disconnectably joining each of the three panels in juxtaposition forming at least two junctures between panels with the exterior surfaces positioned at an angle for use as teaching aids; and stacking the three boards generally flat forming an assembly for transport.

1 Claim, 6 Drawing Sheets

MULTIPLE ACTIVITY CENTER

BACKGROUND OF THE INVENTION

This invention relates to an activity apparatus and method for educational, therapeutic, and/or recreational activity and, more particularly, to an activity apparatus and method having plural dispositional utility panels from which a variety of educational, recreational, and therapeutic activities may be conducted, yet which can be readily collapsed for convenient transport.

Educational displays have been previously used for instructing and visually demonstrating concepts to students involved in educational and therapeutic activities. Teachers typically use teaching aids, such as chalkboards, white writing boards, felt boards and the like to teach the students. While these type of displays are suitable for their intended purposes, the teaching aids do not allow for intimate interaction with the students nor do they provide a variety of work surfaces in one apparatus for use in conducting various teaching, recreational, or therapeutic activities. Furthermore, these types of boards are usually single boards typically placed on an easel, affixed to a wall, or require some other form of support. Quite often when using such a board unattached or without additional support, it is difficult to maintain the board in a proper workable angle and the board often slides or falls. Although more than one work surface is often needed to better illustrate lessons, there have been no adequate devices for presenting multiple work surfaces or display surfaces for use as teaching aids. It has also been known to use a one-piece foldable laminate having a mirror on one side for speech therapy. The laminate is scored so it folds into a tent shape and the mirror is positioned to mirror the student during therapy.

With the increasing need of teacher travel such as in the field of special education, it is becoming increasingly necessary for teachers and the like to have teaching aids and displays which can be readily set up for use by the teacher and student and can be readily folded for easy transport.

Various types of visual aid training devices have been provided in the past for use in the classroom and other teaching environments. For example, U.S. Pat. Nos. 5,865, 627 and 4,115,930 disclose single display boards which can be used for the attachment of pressure sensitive numbers and letters, as well as pictures. U.S. Pat. No. 5,366,378 discloses a visual teaching aid for various mathematical relationships which utilizes a single elongated work device. U.S. Pat. No. 5,501, 603 discloses a modularized visual training aid for classroom instruction which includes a base for supporting upright only a single display or work surface.

Accordingly it is an object of the present invention to provide an apparatus having multiple activity display and work panels in one apparatus.

It is also an object of the invention to provide a multiple activity display apparatus for educational, therapeutic and recreational use which is lightweight, foldable for transport, and yet sturdy enough to be self supporting in a number of display positions for multiple activities.

Another object of the present invention is to provide a multiple activity apparatus having plural positional panels which are simple to utilize and comprised of few parts to allow for quick and easy set-up and knock-down.

SUMMARY OF THE INVENTION

The above objectives are accomplished according to the present invention by providing a multiple activity apparatus for visual educational, recreational or therapeutic uses having plural, positionable utility panels which can be collapsed for convenient portability. The invention comprises three utility panels which include rectangular frame members joined at abutting ends in a triangular configuration having open triangular ends, a base frame and two upwardly converging side frames. A utility board is mounted in each respective frame member, each board having an exterior work or display surface whereby a pair of upright utility panels are selectively positionable, with the remaining panel providing a base. The three rectangular frame members are disconnectably joinable at abutting ends. The exterior surfaces may include a mirror, a wipe on-off dual function and magnetic board, and a pocket board. The three rectangular frame members are disconnectably joinable by rotatable snap members. The frame members are constructed of plastic having contrasting colors.

In accordance with the invention, a method is provided for utilizing visual teaching aids comprising the steps of assembling three rectangular utility panels, each having an exterior surface useful for an educational, therapeutic, or recreational activity. The method includes disconnectably joining each of the three panels in juxtaposition forming at least two junctures between boards with the exterior surfaces positioned for use as activity aids. Next, the method includes the steps of arranging the panels in a triangular configuration, including three junctures between panels at a top and bottom of each board, and disconnecting at least one of the junctures between the boards. Preferably the method includes the steps of providing a mirror on a panel, a combination magnetic and dry erase board on a panel, and a pocket panel. The method includes the step of forming the junctures by snapping the panels together.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

Figure 1:
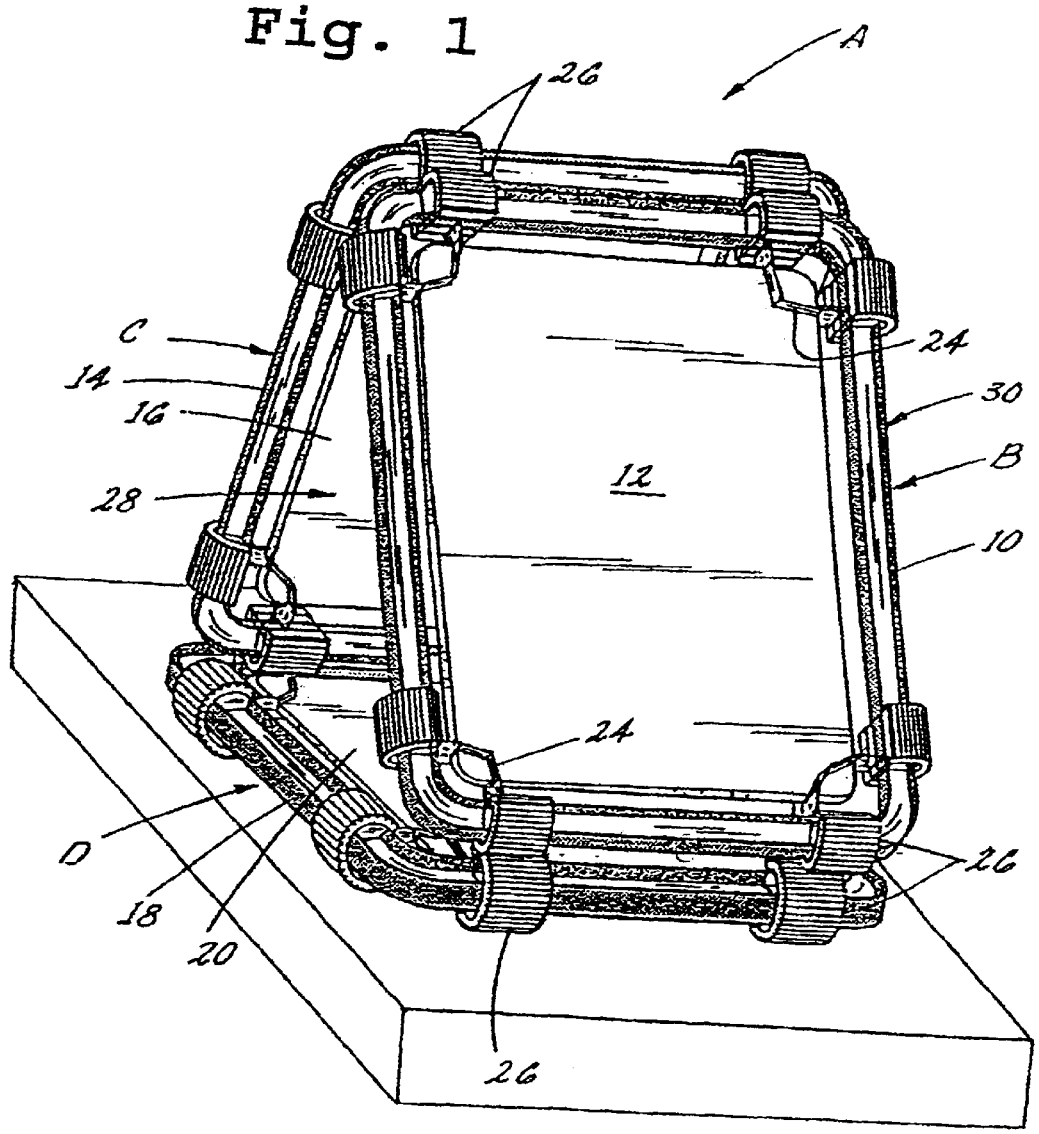
FIG. 1 is a perspective view illustrating a multiple activity apparatus having multiple utility panels which are selectively positional on a support surface in an erect configuration.

As can best be seen in FIG. 1, an activity apparatus, designated generally as A, is illustrated which includes three rectangular utility panels B, C, and D joined together to provide an upright multiple activity apparatus having at least two positionable utility panels. Rectangular panel B includes a rectangular frame 10 and a utility board 12, rectangular panel C includes rectangular frame 14 and a utility board 16, and rectangular panel D includes a rectangular frame 18 and a utility board 20. Attachment elements are provided at the corners of each frame member for attaching the utility boards inside the frame members. Any suitable attachment elements can be used such as a flexible plastic strap 24 having a slot 24a which receives edges of the board. The straps flex in and out to release and attach the board, respectively.

Figure 4:
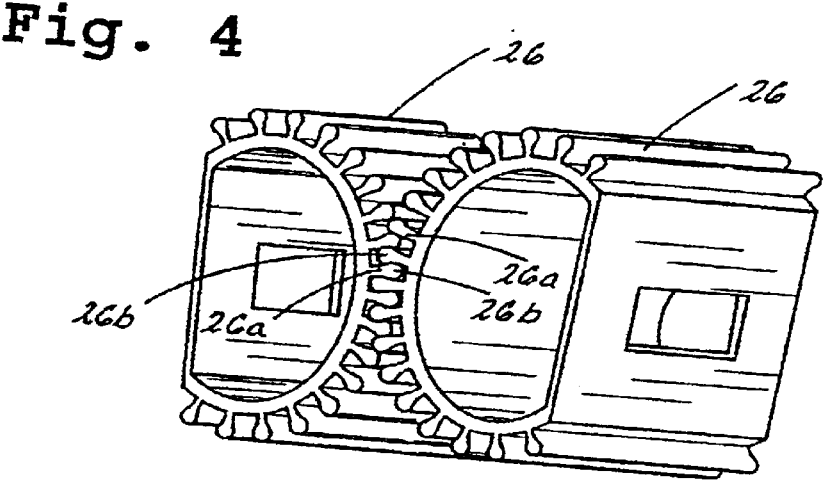
FIG. 4 is a perspective view illustrating disjoinable connectors according to the invention for a multiple activity apparatus connectable in an erect configuration and disconnectable in a knock-down configuration as shown in FIG. 3.
Figure 6:
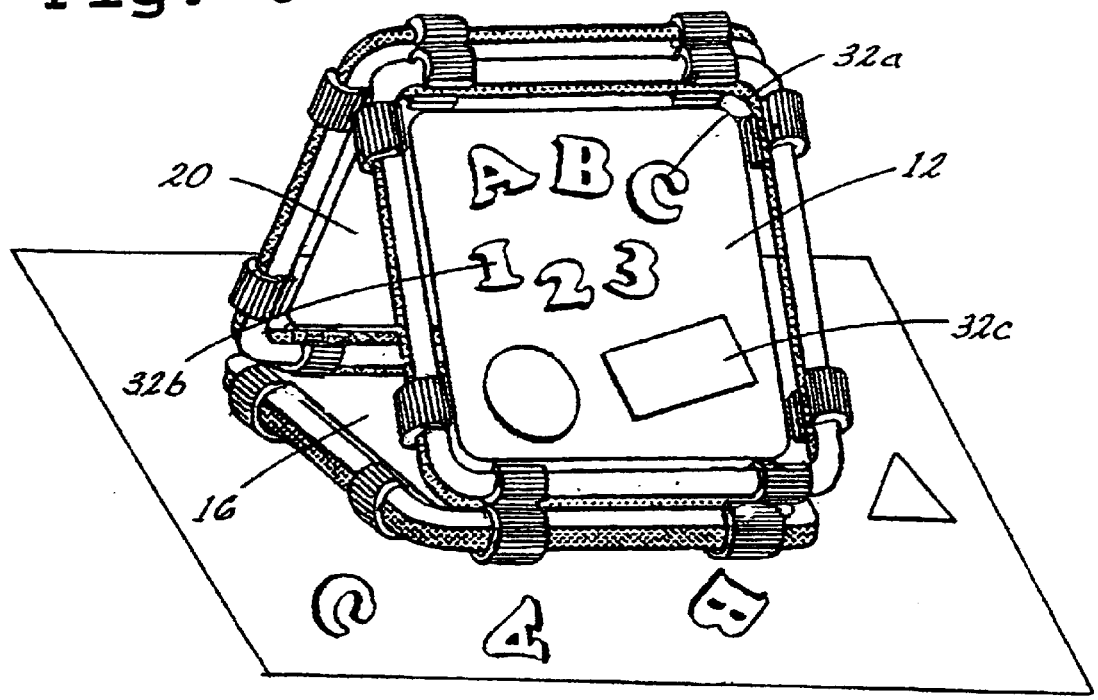

There is a plurality of disconnectable rotary connector members 26 for connecting the abutting edges of panels B, C, and D together in such a manner that the adjoining panels form a triangular multiple display apparatus. The rotary connectors allow the frame members to separate into a knock-down configuration wherein the three panels can be connected and stacked flat as shown in FIG. 6 for portability. Each rotary/snap connector 26 includes a plurality of splines 26a with bulbous interlocking elements 26b which snap and interlock together (FIG. 4). It will also be noted that the work panels are recessed in the frame members which protects them in transport. In an erected configuration, the three rectangular panels B, C, and D are joined together at the abutting sides. The panels form a triangular configuration having open triangular ends designated generally as 28 and 30. Suitable frames and connectors are available from Adamen, Inc. of Winnipeg, Manitoba, Canada, which manufactures children's playsets under the name "Frame 2 Frame." The frames are used to build various play sets, houses, etc.

Figure 2:
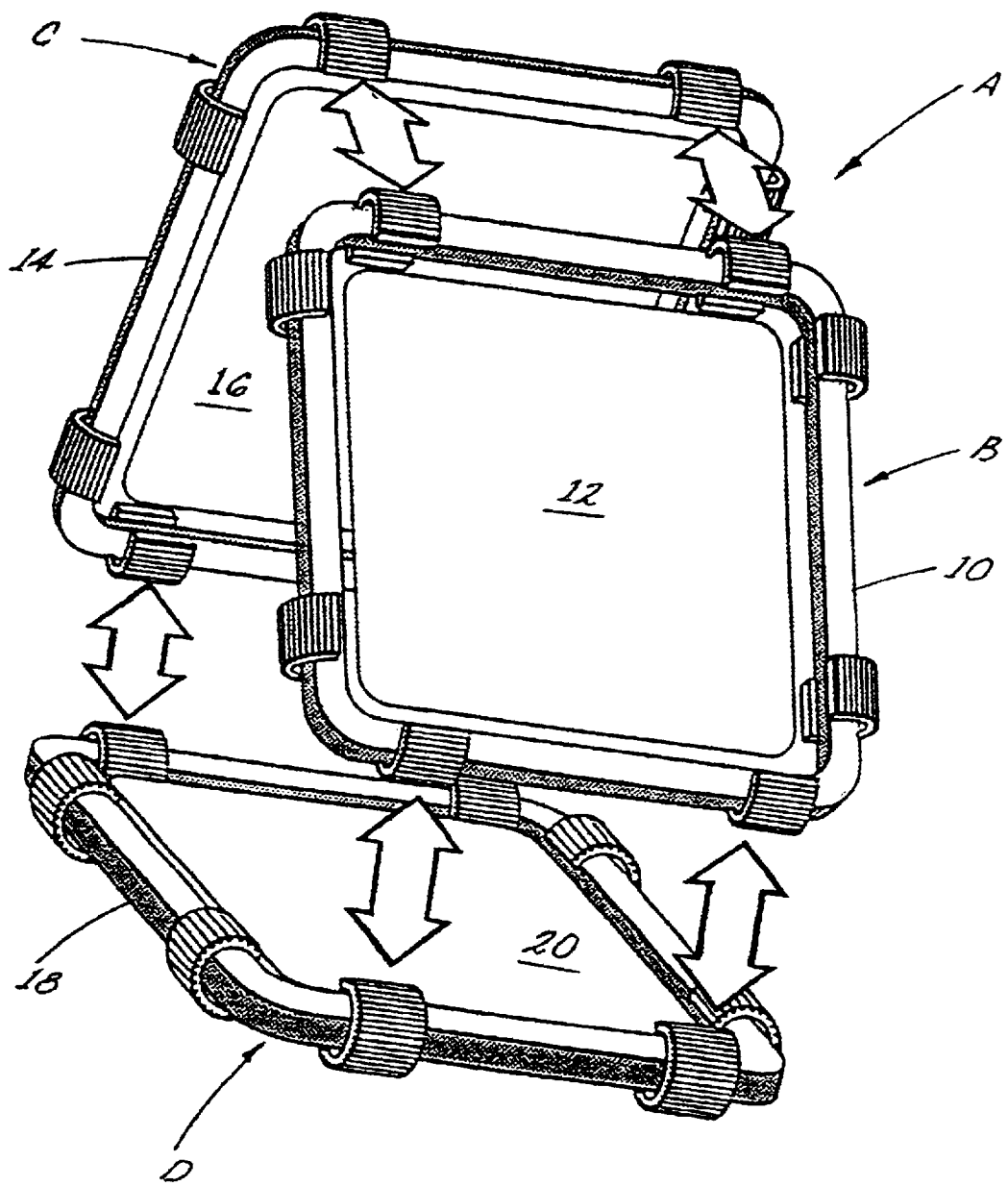
FIG. 2 is a perspective view of the multiple activity apparatus of FIG. 1 with the utility panels disconnected at two adjoining ends.

As can best be seen in FIG. 2, the three utility boards 12, 16, and 18 are provided with different educational, therapeutic, or recreational surfaces. In the illustrated embodiment, utility board 12 is preferably a write-on/wipe-off white board which can be easily written on with erasable markers and the like and/or erased. In addition, it is preferred that utility board 12 provide a dual function of a magnetic board so that magnetic letters 32a, numbers 32b, symbols and shapes 32c, etc., can be attached to the surface of the board. Utility board 16 is preferably a mirror for use in speech therapy, as will be explained more fully hereinafter. Preferably display board 20 is a pocket board having a plurality of transparent pockets 20a for holding sheet like material such as cards 36. In this manner, any two of the utility boards may be selectively positioned in an upright manner and angled so that they are easy to work with. The boards lie at a 45 degree angle which presents a convenient, ergonomic attitude for work. Preferably frame members 10, 14, 18 are made of plastic and are of different, contrasting colors to provide an attraction to the student, particularly in the case of very young students.

Figure 3:
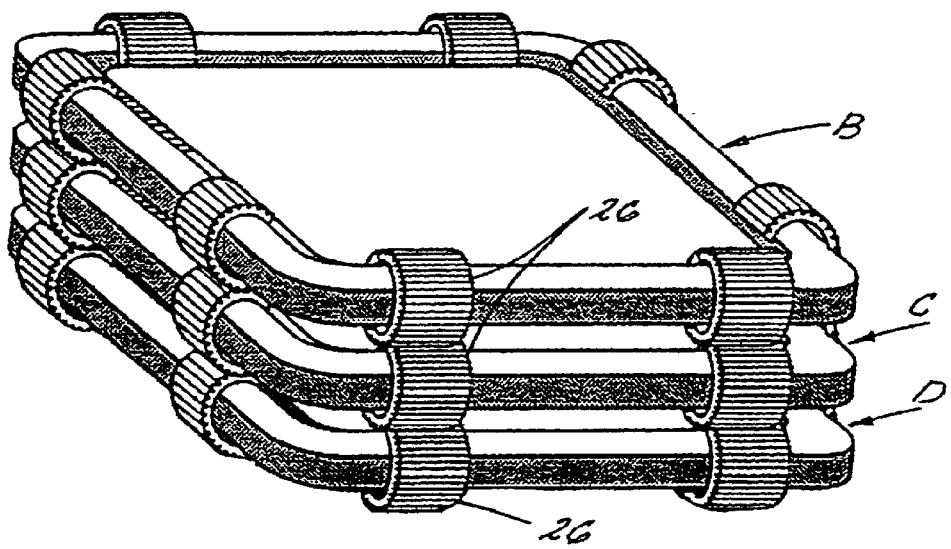
FIG. 3 is a perspective view illustrating the multiple activity apparatus of the present invention in a knock-down, folded configuration.

In regard to the method of the invention, the method includes utilizing multiple activity apparatus A as a visual aid which comprises the steps of assembling three utility panels B, C, and D together, each having a utility board useful as an educational, therapeutic, or recreational aid. The method includes disconnectably adjoining each of the three panels in juxtaposition forming at least three junctures between the adjoining edges of the panels wherein the utility boards are positioned for use as aids in an erected configuration, and the three panels may be stacked and connected together in a knock-down configuration to form an assembly for transporting the activity apparatus to different locations for activities. In other aspects of the invention, the method includes arranging the panels in a triangular configuration, including three junctures between panels at a top and bottom of each panel, and disconnecting at least one of the junctures when stacking the boards (FIGS. 2 and 3). The method further includes the steps of providing a mirror board on one panel, a combination magnetic and write-on/wipe-off board on a second panel, and providing a plurality of transparent pockets on yet a third panel. The junctures between the panels in the present invention are formed by snapping the boards together using releasable connectors in the preferred form of snap connectors 26.

Figure 7:
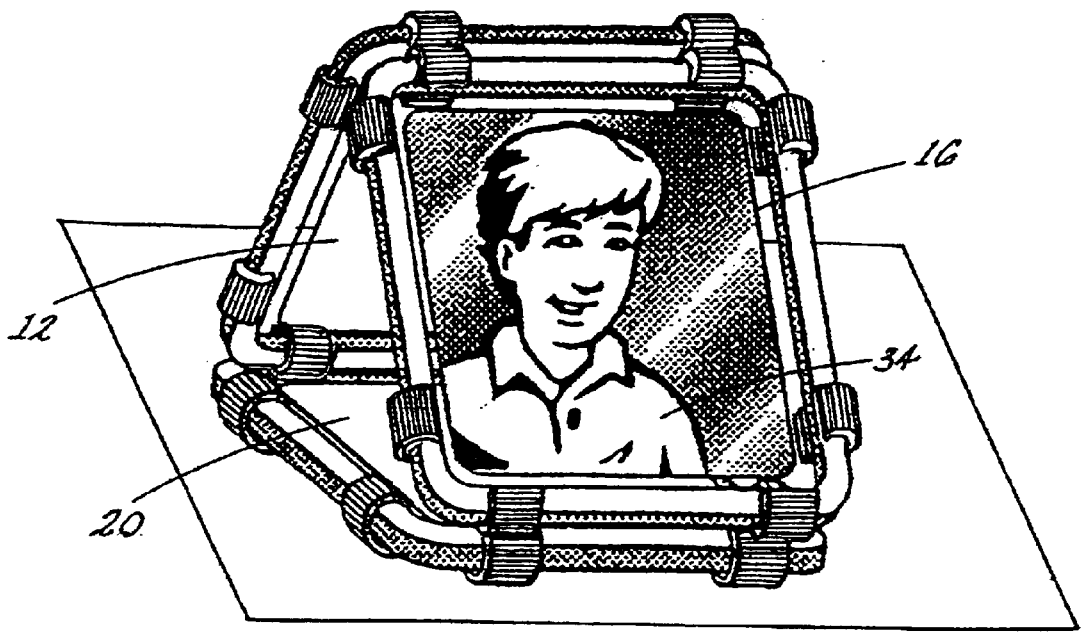
FIG. 7 is a perspective view of a multiple activity apparatus according to the invention illustrating a second utility panel which is a mirror.

In operation, the activity apparatus and method for educational, therapeutic, recreational activity, and the like, can be used to vary board surfaces to achieve different things with children and other pupils. Mirror utility board 16 is quite advantageous in teaching students to improve their speech. Speech therapists and pathologists utilize the mirror to let children watch themselves as they sound out words so that they can best mimic the teacher's mouth movements and learn to speak more clearly and correctly (FIG. 7). Mirror activity panel is used so that the student may watch the muscle movements of the articular muscles of his mouth. By watching the muscle movements of the mouth, the student can see how the mouth is shaped in order to pronounce the correct sounds. In this manner, by practice, the student can learn proper articulation of sounds and words.

Figure 5:
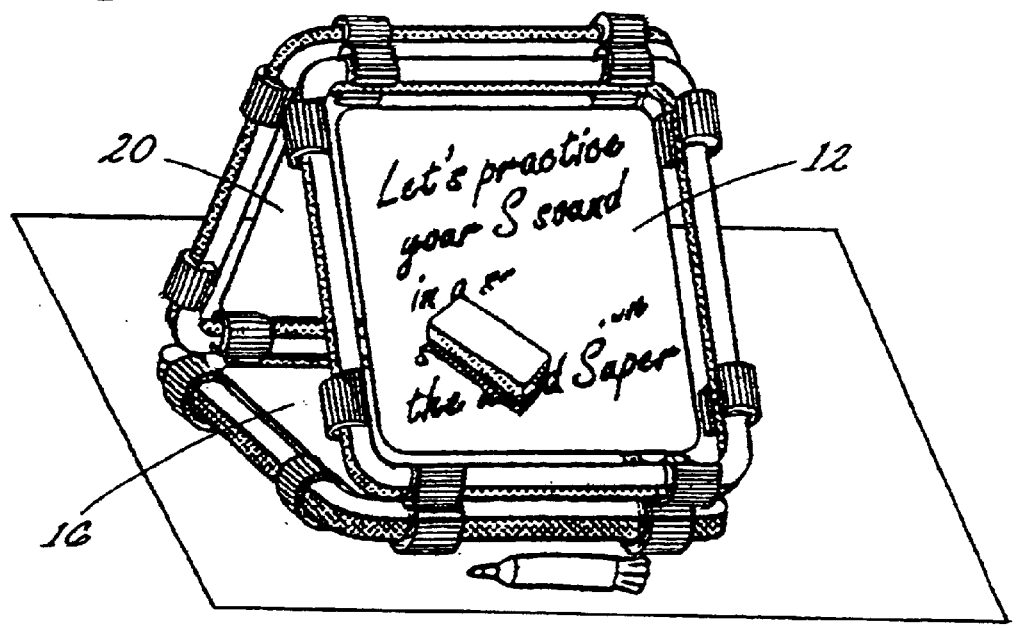
FIGS. 5 and 6 are a perspective view illustrating multiple activity apparatus according to the invention wherein a dual-function utility panel is illustrated which includes a white board that functions as an erase board in FIG. 5, and a magnetic board in FIG. 6.

Write-on/wipe-off board 12 can be utilized like a chalkboard to illustrate visually the teacher's points and lessons (FIG. 5). The write-on/wipe-off board has a dual function as a magnet board to which magnetic letters and numbers can be attached to teach math and reading, etc., (FIG. 6). The second function is to serve as a magnetic board to hold magnetic letters, numbers and other magnetic curriculum sets.

Figure 8:
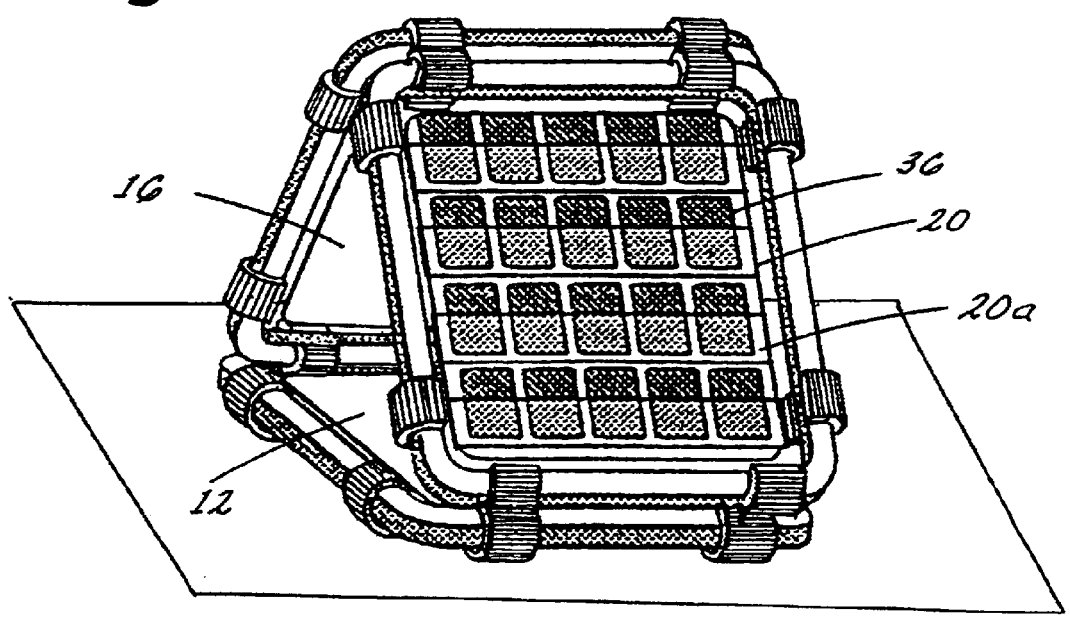
FIG. 8 is a perspective view of a multiple activity apparatus according to the invention selectively positioned to illustrate a third utility panel which includes a card holding board for activities using a deck of cards.
Figure 9:
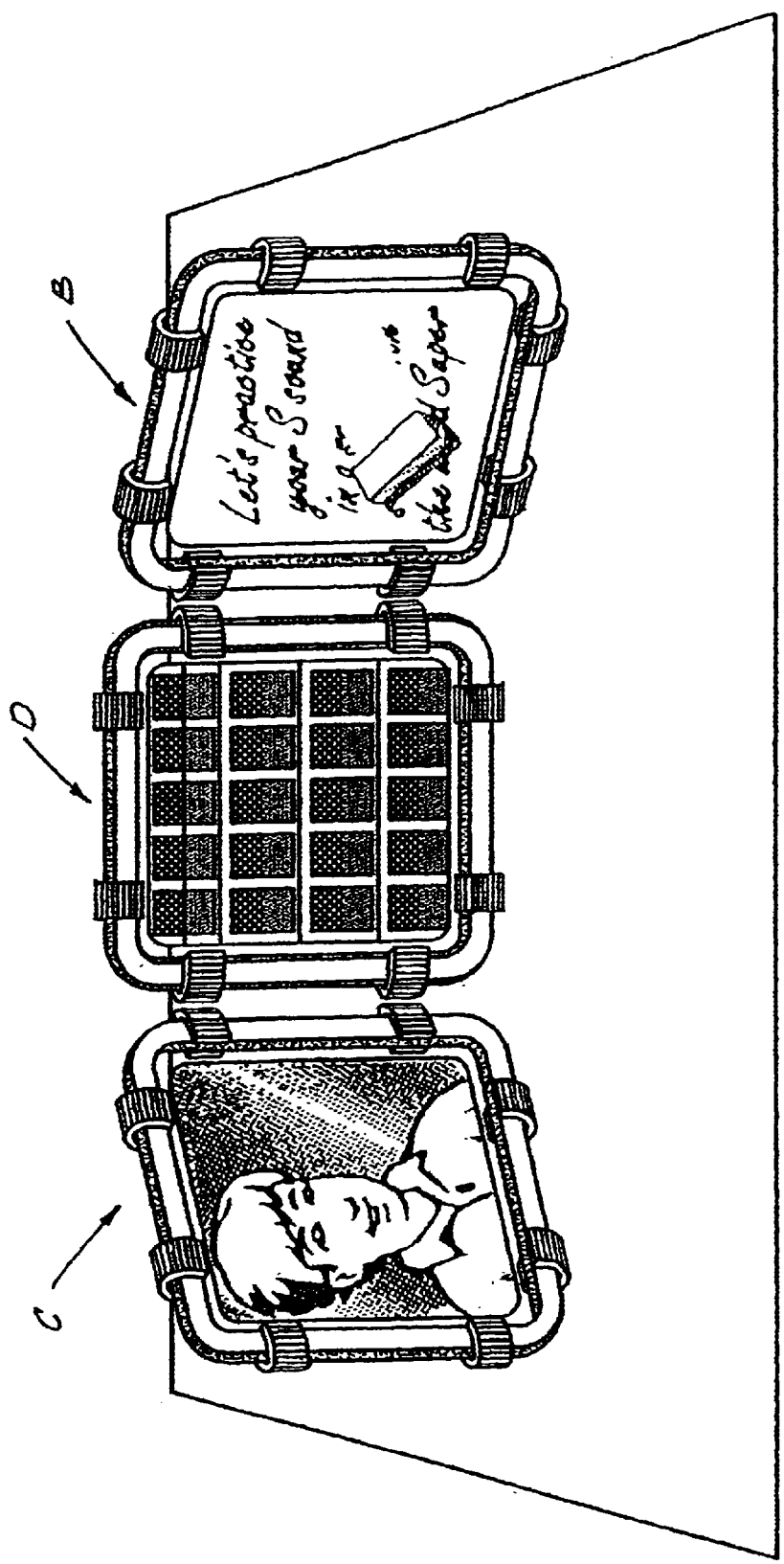
FIG. 9 is a perspective view illustrating a multiple activity apparatus according to the invention where two of the adjoining ends of the apparatus are disconnected so that all three of the utility panels are displayed at one time.

Utility pocket board 20 can be filled with a variety of flash cards, which is a common method of learning math and fact filled subjects (FIG. 8). The pocket panel includes a plurality of card holder strips or pockets 20a which are transparent. Activity cards are placed behind the card holder strips so they can be seen by the student. For example, Weber® articulation cards, available from Super Duper Publications of Greenville, S. C., can be used to teach the student proper articulation. In that case, the cards may be placed behind the strips as the student provides the correct articulation of the word with the goal being to fill up the strips with words. In another example, different word decks with words from different categories, such as countries, animals, and the like can be used in the same manner.

Other examples of possible work panels would be a felt board, a chalk board, or a peg board. In that case, each of the work panels could be made a 2-in-1 panel. Additionally the structure of the multiple activity center allows for the incorporation of barrier teaching methods or games. The teacher and a student or two students can sit on opposite sides of the apparatus and utilize the multiple activity center simultaneously. The activity apparatus can be used as a divider or barrier that prevents students from seeing the answer to problems or other visual cues. An example would be to utilize activity cards would be to use the apparatus as a barrier game. In that case, the teacher would be on one side and the student Would be sitting in front of the card holder strips. The teacher would ask for a card according to a certain category, and the student would select a card. If the card was correct, the student would take the card out of the strip and accumulate cards.

While a preferred embodiment of the invention has been described using specific terms, such description is for, illustrative purposes only, and it is to be understood that changes and variations may be made without departing from the spirit or scope of the following claims.

What is claim is:

1. A method of forming and utilizing a teaching aid, including the steps of:

providing a plurality of utility panels each functionable as a teaching aid;

providing a first of said panels to include a side comprising a combination magnetic and dry erase surface;

providing a second of said panels to include a side comprising a mirror;

providing a third of said panels to include a side having a surface with a plurality of pockets;

providing rotatable connectors along edges of each of said panels and utilizing said connectors to connect said panels together into varying configurations; and positioning said panel configurations into a triangular configuration wherein two of said side surfaces are positioned as teaching aids and positioning said panels into a stacked configuration wherein said panels are arranged along a single plane for storage and transport.

* * * * *